(12) United States Patent
Blohm et al.

(10) Patent No.: US 10,521,175 B2
(45) Date of Patent: *Dec. 31, 2019

(54) SYSTEM AND METHOD OF DATA PROCESSING FOR A PRINTING OPERATION

(71) Applicant: Quad/Graphics, Inc., Sussex, WI (US)

(72) Inventors: Eric Blohm, Mukwonago, WI (US); Jeffrey S. Henke, Oconomowoc, WI (US)

(73) Assignee: Quad/Graphics, Inc., Sussex, WI (US)

( * ) Notice: Subject to any disclaimer, the term of this patent is extended or adjusted under 35 U.S.C. 154(b) by 382 days.

This patent is subject to a terminal disclaimer.

(21) Appl. No.: 15/433,658

(22) Filed: Feb. 15, 2017

(65) Prior Publication Data

US 2017/0161001 A1 Jun. 8, 2017

Related U.S. Application Data

(63) Continuation of application No. 14/738,433, filed on Jun. 12, 2015, now Pat. No. 9,575,705, which is a (Continued)

(51) Int. Cl.
*G06F 17/30* (2006.01)
*G06F 3/12* (2006.01)
(Continued)

(52) U.S. Cl.
CPC .......... *G06F 3/1293* (2013.01); *G06F 3/1243* (2013.01); *G06F 3/1296* (2013.01); (Continued)

(58) Field of Classification Search
CPC .... G06F 3/1293; G06F 3/1243; G06F 3/1296; G06Q 30/01; G06Q 30/02
See application file for complete search history.

(56) References Cited

U.S. PATENT DOCUMENTS 4,882,764 A 11/1989 Reynolds et al.
4,885,785 A 12/1989 Reynolds et al.
(Continued)

OTHER PUBLICATIONS

Final Office Action for U.S. Appl. No. 12/112,876, dated Apr. 4, 2011, 17 pages.
(Continued)

*Primary Examiner* — Syed H Hasan
(74) *Attorney, Agent, or Firm* — Foley & Lardner LLP

(57) ABSTRACT

Systems and methods relating to preparing data for use in a printing operation are provided. One method includes receiving selected records from a first data source. The selected records have been subjected to a first record characteristic updating step and the selected records comprise mail information useful for delivery of printed materials. The method further includes updating the selected records with a second record characteristic updating step. A time at which the second record characteristic updating step is performed is determined in relation to a print production schedule for the printed materials. The method further includes creating a postal pre-sort file based upon the updated selected records for use in the printing operation. The printing operation is performed on a printing device based on the pre-sorted records.

20 Claims, 10 Drawing Sheets

Related U.S. Application Data continuation of application No. 13/776,431, filed on Feb. 25, 2013, now Pat. No. 9,069,515, which is a continuation of application No. 12/112,876, filed on Apr. 30, 2008, now Pat. No. 8,386,528.

(51) Int. Cl.
  *G06Q 30/02* (2012.01)
  *G06Q 30/00* (2012.01)

(52) U.S. Cl.
  CPC ............ *G06Q 30/01* (2013.01); *G06Q 30/02* (2013.01); *G06Q 30/0255* (2013.01)

(56) References Cited

U.S. PATENT DOCUMENTS

| | | | |
|---|---|---|---|
| 4,887,530 A | 12/1989 | Sainio | |
| 5,013,022 A | 5/1991 | Graushar | |
| 5,025,610 A | 6/1991 | Graushar | |
| 5,029,830 A | 7/1991 | Quadracci | |
| 5,076,163 A | 12/1991 | Sainio | |
| 5,102,110 A | 4/1992 | Reynolds | |
| 5,422,821 A | 6/1995 | Allen et al. | |
| 5,453,926 A | 9/1995 | Stroschin et al. | |
| 5,467,973 A | 11/1995 | Graushar et al. | |
| 5,532,720 A | 7/1996 | Krueger et al. | |
| 5,547,175 A | 8/1996 | Graushar et al. | |
| 5,703,783 A | 12/1997 | Allen et al. | |
| 5,710,886 A | 1/1998 | Christensen et al. | |
| 5,881,538 A | 3/1999 | Blohm | |
| 5,950,401 A | 9/1999 | Blohm et al. | |
| 5,967,050 A | 10/1999 | Seymour | |
| 6,035,280 A | 3/2000 | Christensen | |
| 6,125,760 A | 10/2000 | Graushar et al. | |
| 6,131,101 A | 10/2000 | Maitino et al. | |
| 6,167,326 A | 12/2000 | Graushar et al. | |
| 6,269,609 B2 | 8/2001 | Graushar et al. | |
| 6,292,709 B1 | 9/2001 | Uhl et al. | |
| 6,347,260 B1 | 2/2002 | Graushar et al. | |
| 6,415,582 B2 | 7/2002 | Graushar et al. | |
| 6,457,012 B1 | 9/2002 | Jatkowski | |
| 6,549,892 B1 | 4/2003 | Sansone | |
| 6,694,219 B2 | 2/2004 | Graushar et al. | |
| 6,732,152 B2 | 5/2004 | Lockhart et al. | |
| 6,741,724 B1 | 5/2004 | Bruce et al. | |
| 6,791,050 B2 | 9/2004 | Daniels et al. | |
| 6,826,548 B2 | 11/2004 | Hungerpiller et al. | |
| 6,968,348 B1 | 11/2005 | Carone et al. | |
| 6,985,926 B1 | 1/2006 | Ferlauto et al. | |
| 7,013,803 B2 | 3/2006 | Hansen et al. | |
| 7,096,088 B2 | 8/2006 | Graushar et al. | |
| 7,102,095 B2 | 9/2006 | Blohm | |
| 7,139,783 B2 | 11/2006 | Hinshaw et al. | |
| 7,184,168 B2 | 2/2007 | Beckman et al. | |
| 7,246,798 B2 | 7/2007 | Graushar et al. | |
| 7,253,929 B2 | 8/2007 | Wendel | |
| 7,254,573 B2 | 8/2007 | Burke | |
| 7,260,075 B2 | 8/2007 | Singh et al. | |
| 7,305,404 B2 | 12/2007 | Owens et al. | |
| 7,325,375 B2 | 2/2008 | Graushar et al. | |
| 7,333,878 B2 | 2/2008 | Graushar et al. | |
| 7,343,294 B1 | 3/2008 | Sandholm et al. | |
| 7,376,680 B1 | 5/2008 | Kettler et al. | |
| 7,391,781 B2 | 6/2008 | Payne et al. | |
| 7,475,523 B2 | 1/2009 | Graushar et al. | |
| 7,478,140 B2 | 1/2009 | King et al. | |
| 7,707,164 B2 | 4/2010 | Kapochunas et al. | |
| 7,715,041 B2 | 5/2010 | Henke et al. | |
| 7,731,089 B2 | 6/2010 | Chang et al. | |
| 7,778,840 B2 | 8/2010 | Krause et al. | |
| 7,792,683 B2 | 9/2010 | Sipe et al. | |
| 2001/0025274 A1 | 9/2001 | Zehr et al. | |
| 2002/0023057 A1 | 2/2002 | Goodwin et al. | |
| 2002/0062241 A1 | 5/2002 | Rubio et al. | |
| 2002/0103697 A1 | 8/2002 | Lockhart et al. | |
| 2003/0114955 A1 | 6/2003 | Daniels, Jr. | |
| 2004/0265095 A1 | 12/2004 | Blohm et al. | |
| 2005/0021856 A1 | 1/2005 | Basile et al. | |
| 2005/0075988 A1 | 4/2005 | Cordery et al. | |
| 2005/0114209 A1 | 5/2005 | Mattingly et al. | |
| 2005/0137991 A1 | 6/2005 | Bruce et al. | |
| 2005/0197975 A1* | 9/2005 | Benson | G07B 17/00185 705/410 |
| 2005/0234913 A1 | 10/2005 | Carone et al. | |
| 2005/0267821 A1 | 12/2005 | Anderson | |
| 2006/0053084 A1* | 3/2006 | Haas | G06Q 10/0833 705/410 |
| 2006/0080266 A1 | 4/2006 | Kiani et al. | |
| 2006/0112133 A1 | 5/2006 | Ljubicich et al. | |
| 2007/0129957 A1 | 6/2007 | Elliott et al. | |
| 2008/0027980 A1 | 1/2008 | Owens et al. | |
| 2008/0033738 A1 | 2/2008 | Conard et al. | |
| 2008/0040269 A1 | 2/2008 | Deans et al. | |
| 2008/0065395 A1 | 3/2008 | Ferguson | |
| 2008/0091460 A1 | 4/2008 | Paul | |
| 2008/0137625 A1 | 6/2008 | Hori et al. | |
| 2008/0159222 A1 | 7/2008 | Akram et al. | |
| 2008/0291486 A1 | 11/2008 | Isles et al. | |
| 2008/0300938 A1 | 12/2008 | Pintsov et al. | |
| 2010/0228387 A1* | 9/2010 | Bowers | B07C 3/14 700/226 |
| 2017/0206500 A1* | 7/2017 | Deshpande | G06F 16/148 |

OTHER PUBLICATIONS

Final Office Action for U.S. Appl. No. 12/112,876, dated Nov. 1, 2010, 16 pages.
Non-Final Office Action for U.S. Appl. No. 12/112,876, dated Oct. 6, 2011, 23 pages.
Non-Final Office Action for U.S. Appl. No. 13/776,431 dated Sep. 19, 2014. 17 pages.
Non-Final Office Action for U.S. Appl. No. 14/738,433, dated May 16, 2016. 8 pages.
Notice of Allowance for U.S. Appl. No. 12/112,876, dated Oct. 31, 2012, 12 pages.
Notice of Allowance for U.S. Appl. No. 13/776,431, dated Feb. 27, 2015, 11 pages.
Notice of Allowance for U.S. Appl. No. 14/738,433 dated Oct. 7, 2016. 5 pages.

* cited by examiner

32 — PREFIX: ☐ MR. ☐ MRS. ☒ MS. ☐ DR.

32 — NAME: MARY JONES

32 — ADDRESS 1: 123 SINGLES LANE

32 — ADDRESS 2: ANYWHERE, NY 12345

32 — ADD A NAME: ☐

32 — MESSAGE: ☒ THANK YOU FOR PURCHASING PRODUCT X. DID YOU KNOW OUR PRODUCT Y GOES GREAT WITH PRODUCT X?

32 — SUPPRESSION: ☐ YES ☒ NO

PREFIX: ☐ MR. ☒ MRS. ☐ MS. ☐ DR.  — 36

NAME: MARY JONES-SMITH — 36

ADDRESS 1: 123 COUPLES COURT — 36

ADDRESS 2: ANYWHERE, WI 67890

ADD A NAME: ☒ JOHN SMITH — 36
        LISA SMITH

MESSAGE: ☒ CONGRATULATIONS ON YOUR — 36
         MARRIAGE. AS A WEDDING GIFT
         PLEASE TAKE AN EXTRA 30%
         OFF OF YOUR NEXT PURCHASE.

SUPPRESSION: ☐ YES ☒ NO — 36

32 → NAME: ROBERT BROWN
32 → ADDRESS 1: 123 WHITE AVE
32 → CODE: DATA SOURCE 1

FIG. 3B

NAME: ROBERT BROWN
ADDRESS 1: 123 WHITE AVE
CODE: DATA SOURCE 1

FIG. 3C

NAME: ROBERT BROWN
ADDRESS 1: 789 BLUE AVE
CODE: DATA SOURCE 1

FIG. 3D

NAME: ROBERT BROWNY
ADDRESS 1: 124 WHITE AVE
CODE: DATA SOURCE 2

FIG. 3E

NAME: ROBERT BROWN

ADDRESS 1: 123 WHITE AVE

CODE: DATA SOURCE 3

SUPPRESSION: ☒ YES  ☐ NO

| DO NOT MAIL |
| DECEASED |
| PRISON |
| OTHER |

NCOALink(TM) Summary

| New Addresses Appended | | Quantity |
|---|---|---|
| Return Code A | COA Match | 168249 |
| Return Code 91 | COA Match: Secondary Number dropped from COA | 1060 |
| Return Code 92 | COA Match: Secondary Number dropped from input | 489 |
| Total NCOALink New Addresses | | 169798 |

| Unforwardable Moves (Nixies) | | Quantity |
|---|---|---|
| Return Code 1 | Foreign Move | 486 |
| Return Code 2 | Moved Left No Address (MLNA) | 1552 |
| Return Code 3 | Box Closed No Order (BCNO) | 475 |
| Return Code 5 | New 11-digit DPBC Is Ambiguous | 153 |
| Return Code 14 | New Address Would Not Convert at Run Time | 210 |
| Return Code 19 | New Address not ZIP+4 coded | 3084 |
| Total Unforwardable Moves | | 5960 |

| NCOALink Match Not Found | | Quantity |
|---|---|---|
| Return Code 0 | No Match | 4407946 |
| Return Code 4 | Street Address with Secondary | 280 |
| Return Code 6 | Conflicting Directions: Middle Name Related | 2 |
| Return Code 7 | Conflicting Directions: Gender Related | 0 |
| Return Code 8 | Other Conflicting Instructions | 1 |
| Return Code 9 | High-rise Default | 61 |
| Return Code 10 | Rural Default | 0 |
| Return Code 11 | Individual Match: Insufficient COA Name for Match | 6 |
| Return Code 12 | Middle Name Test Failed | 103 |
| Return Code 13 | Gender Test Failed | 39 |
| Return Code 15 | Individual Name Insufficient | 13 |
| Return Code 16 | Secondary Number Discrepancy | 93 |
| Return Code 17 | Other Insufficient Name | 51 |
| Return Code 18 | General Delivery | 19 |
| Return Code 20 | Conflicting Directions after re-chaining | 0 |
| Total Unmatched Records | | 4408614 |

| Matched to "Daily Delete" record | | Quantity |
|---|---|---|
| Return Code 66 | Input Address appears in Daily Delete file | 4507 |

| | | Quantity |
|---|---|---|
| Total NCOALink Return Codes: | | 4588879 |

SYSTEM AND METHOD OF DATA PROCESSING FOR A PRINTING OPERATION

CROSS-REFERENCE TO RELATED APPLICATIONS

The present application is a continuation of U.S. patent application Ser. No. 14/738,433, filed Jun. 12, 2015, which is a continuation of U.S. patent application Ser. No. 13/776,431, filed Feb. 25, 2013, which is a continuation of U.S. patent application Ser. No. 12/112,876, filed Apr. 30, 2008, all of which are incorporated herein by reference in their entireties.

BACKGROUND

Communication operations may employ various types of communication devices (e.g., computers, internet, phones, printing operations such as web offset, rotogravure, flexographic, digital printing, inkjet, etc.). Any communication device or communication operation will have the problem of generating communication products with the most up-to-date communication data. For example, printing data characteristics (e.g., mailing address, name, prefix, suppression status, merge/purge status, coding status, messaging, etc.) of a recipient may have changed after the recipient was selected for a marketing campaign but before the communication operation (e.g., printing and mailing) was processed. In another example, text messaging data or email messaging data (e.g., electronic address, name, prefix, suppression status, merge/purge status, coding status, messaging, etc.) of a recipient may have changed after the recipient was selected for a marketing campaign but before the electronic communication operation was processed.

As one example, when the recipient's mailing address has changed but was not incorporated into the printing data before the printing job was processed, the targeted recipient may not receive the intended information. Since the targeted recipient may not have received the intended information, the time and monies spent to deliver this information will have diminished value. Elimination or depreciation of these types of occurrences not only would result in a more efficient delivery of information to the intended recipients, but would also potentially provide for less waste (both in terms of cost of product and waste generated to the detriment of the environment) and increase customer satisfaction (e.g., by potentially reducing non-compliance with specific customer requests such as do-not-mail requests, or other activities).

The teachings herein extend to those embodiments, which fall within the scope of the appended claims, regardless of whether they accomplish one or more of the above-mentioned needs.

SUMMARY

According to one exemplary embodiment, a method of preparing data for use in a printing operation includes receiving selected records from a first data source. The selected records have been subjected to a periodic first record characteristic updating step and the selected records comprise mail information useful for delivery of printed materials. The method further includes storing the selected records from the first data source in a second data source for use in the printing operation using one or more computing devices. The method further includes preparing a print production schedule for the printed materials and updating the selected records with a second record characteristic updating step. A time at which the second record characteristic updating step is performed is determined in relation to the print production schedule. The method further includes creating a postal pre-sort file based upon the updated selected records for use in the printing operation. The printing operation is performed on a printing device based on the pre-sorted records.

According to another exemplary embodiment, a data processing system includes a processor configured to receive selected records from a first data source. The selected records have been subjected to a first record characteristic updating step and the selected records comprise mail information useful for delivery of printed materials. The process is further configured to store the selected records from the first data source in a second data source for use in a printing operation using one or more computing devices. The processor is further configured to update the selected records with a second record characteristic updating step. A time at which the second record characteristic updating step is performed is determined in relation to a print production schedule for the printed materials. The processor is further configured to create a postal pre-sort file based upon the updated selected records for use in the printing operation. The printing operation is performed on a printing device based on the pre-sorted records.

According to yet another exemplary embodiment, a method of preparing data for use in a printing operation includes receiving selected records from a first data source. The selected records have been subjected to a first record characteristic updating step and the selected records comprise mail information useful for delivery of printed materials. The method further includes updating the selected records with a second record characteristic updating step. A time at which the second record characteristic updating step is performed is determined in relation to a print production schedule for the printed materials. The method further includes creating a postal pre-sort file based upon the updated selected records for use in the printing operation. The printing operation is performed on a printing device based on the pre-sorted records.

BRIEF DESCRIPTION OF THE DRAWINGS

FIGS. 2A-2B are illustrations of comparing record characteristics to a record characteristic reference data, according to exemplary embodiments;

FIGS. 3A-3E are additional illustrations of comparing record characteristics to a record characteristic reference data, according to exemplary embodiments;

FIG. 9 is an illustration of employing the data processing system in a catalog retailer space, according to an exemplary embodiment.

DETAILED DESCRIPTION

Figure 1:
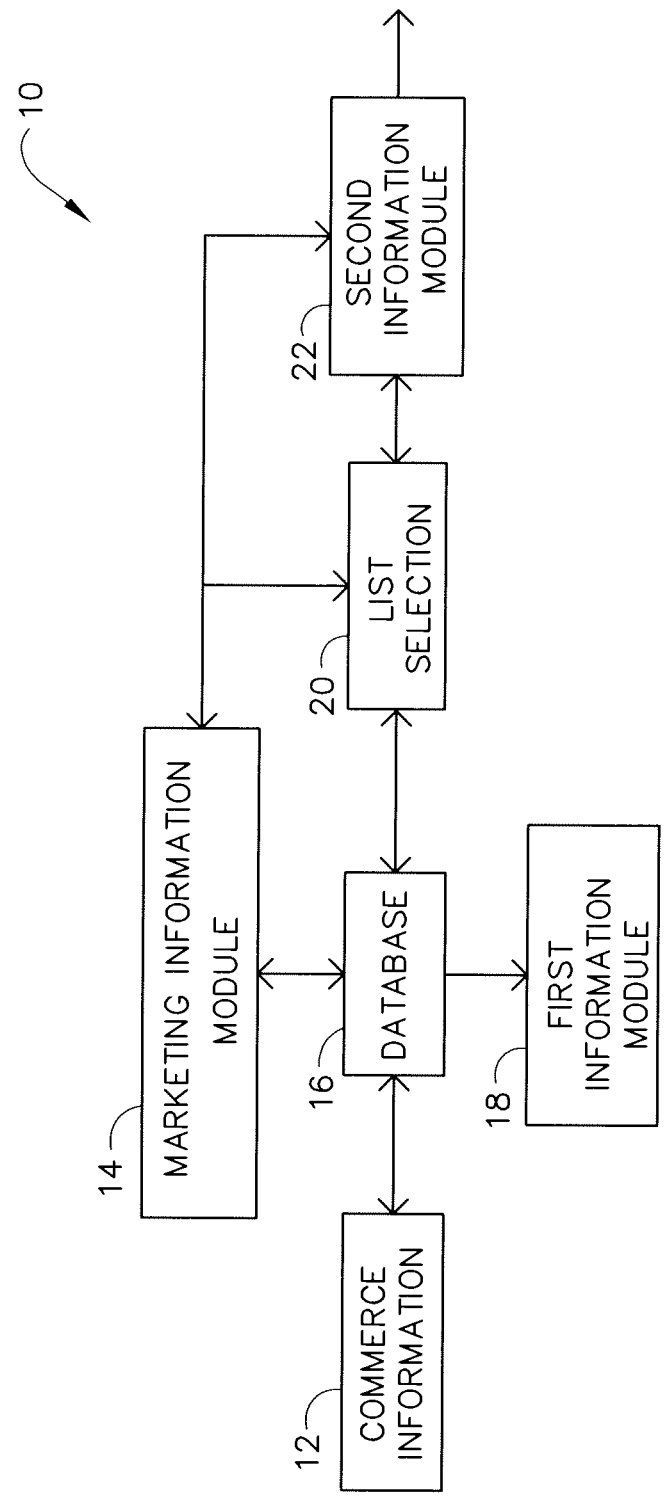
FIG. 1 is a block diagram of the data flow, according to an exemplary embodiment.

In FIG. 1, a block diagram of the data flow is shown, according to an exemplary embodiment. A commerce information module 12 communicates with a data source such as a database 16 (e.g., a transaction database configured to store user transaction data, a client relations management database, etc.), according to exemplary embodiments. Commerce information module 12 transfers various user or consumer data to database 16. The user or consumer data may be the user's name, the user's address, the user's preferred prefix, other demographic information (e.g., age, sex, occupation, marital status, height, weight, etc.), transactions (e.g., purchases, returns, complaints, exchanges, etc.), bill paying history (e.g., excellent, above average, average, etc.), business information (e.g., name, customer purchases, supplier purchases, etc.), internet history (e.g., sites visited, sites purchased from, site visited frequency, surveys, etc.), phone history (e.g., purchasing transactions, surveys, etc.), other user data, or any combination thereof. The user data may be updated from time to time (e.g., daily, weekly, monthly, etc.) with new transaction data.

An example of user data may include name—Mary Jones; age—30; sex—female; address—123 Singles Lane, Anywhere, N.Y. 12345; transaction—purchased car insurance policy from xyz company; bill paying history—excellent; and phone history—surveyed on x date regarding car insurance policy purchased and gave a rating of excellent. It should be noted that all names and other record information used herein are fictitious and used for example only. Any likeness to an actual person is unintended and coincidental only. Moreover, such record information is exemplary of any record information and should not be construed as limiting the scope of the invention.

Another example of user data may include name—John Smith; age—30; sex—male; address—456 Singles Lane, Anywhere, N.Y. 12345; transaction—purchased jewelry from xyz company; bill paying history—average; business information—Nuts and Bolts, Inc., major customer x purchased 100,000 units; internet history—travel sites visited has increased 1,000 percent.

In an exemplary embodiment, a transaction relating to a purchase may include manufacturer data, product data, model data, financing, purchaser information, seller information, date and time of purchase, media used, etc. The manufacturer data may include the name of the manufacturer, address of the manufacturer, primary product lines, secondary product lines, complementary product lines, annual sales data, etc. In an exemplary embodiment, a user may purchase a sweater which is a primary product line of the manufacturer. In this exemplary embodiment, data relating to complementary product lines (e.g., gloves, hats, boots, etc.) may be included with data relating to the sweater transaction.

In other exemplary embodiments, a transaction relating to an exchange may indicate that a user exchanged a large blue sweater for a large green sweater, exchanged a large blue sweater for a large blue hat, or exchanged a large blue sweater for a medium blue sweater, etc. This information may be used by marketing personnel to determine what marketing campaign this individual should be included in. For example, the exchanging of a large blue sweater for a medium blue sweater may indicate that the person has lost weight and/or prefers the color blue. In another example, the exchanging of a large blue sweater for a large green sweater may indicate that the person prefers the color green.

In another exemplary embodiment, user data associated with John Smith indicates he has increased the amount of times he visits internet travel sites by 1,000 percent. A marketing personnel or program may utilize this data to determine John Smith is planning a vacation/trip. A marketing campaign aimed at selling airplane tickets, hotel rooms, rental cars, luggage, cameras, travel insurance, vacation insurance, etc. may include John Smith in its campaign.

Database 16 may receive this user data (e.g., which may be raw data, may contain duplicate records for a single person, etc.) from various transactional or other information sources (e.g., websites, retail databases, call center databases, direct mail response databases, etc.). A first information module 18 may be utilized to update a record 30 (see FIG. 2A) based on comparing a record characteristic data 32 (e.g., user name, user address, etc.) to a reference data 36 (e.g., user name, user address, etc.). In an exemplary embodiment, reference data 36 is a portion of a reference record 34. Reference record 34 may include updated record characteristic data 32 or reference data 36. In other exemplary embodiments, record characteristic data 32 may be based on a data field, a pull down menu selection, a status box and/or any other way to distinguish data in a record.

In exemplary embodiments, the updated record characteristic data or reference data 36 may be based on list data, such as a national change of address ("NCOA") database or other change of address ("COA") database, a delivery sequence file second generation ("DSF2") database, a computerized delivery sequence ("CDS") certified database (e.g., a database offered by Advoor or CIS), a one pass address correction ("OPAC") database, an address element correction ("AEC") database, an address change service ("ACS") database, line of travel ("LOT") database, a commercial vendor mailing list (e.g., InfoGroup), a publisher or catalog company's marketing database, other data parsing (e.g., parsing name, title, firm, or address data in separate data components such as first name, middle name, last name), or any combination thereof.

Referring to FIG. 1, data in database 16 may be compared to reference data 36 to update record characteristic data 32. A marketing information module 14 may include user target characteristics (e.g., age, sex, income, etc.), marketing budgets, marketing campaign timeframe, campaign count (e.g., number of pieces), targeted return on investment ("ROI"), targeted return on sales, targeted penetration rates, complimentary product pull thorough, regional focus (e.g., Northeast, Southwest, Midwest, etc.), historical campaign characteristics (e.g., success rate for last twenty automobile campaigns, success rate for last ten insurance campaigns, penetration rates for last five Northeast campaigns, data relating to using a certain database or data source, success rate based on user target characteristics, etc.), or any combination thereof. Marketing information module 14 may compare a marketing database comprising data records from database 16 which have been processed, for example, by any data service. In one example, data from a credit card company or other separate data source is used to update or clean up transactional data to create records for the marketing database.

A list selection module 20 may communicate with marketing information module 14 and/or database 16 to generate a list, according to an exemplary embodiment. In an exemplary embodiment, data stored in database 16 has been updated by comparing the data to data stored in first information module 18. In another exemplary embodiment, data stored in database 16 has not been updated by comparing the data to data stored in first information module 18. List selection module 20 may compare data from marketing information module 14 and/or database 16 based on one or more queries created for a marketing campaign. In an exemplary embodiment, a marketing professional may query or select the data comparison criteria. The queries may compare one or more criteria of a targeted demographic (e.g., age group, gender, geographic area, etc.) which are run on marketing information module 14 and/or database 16 to create a list of records of user data comprising the targeted customers for the marketing campaign.

The list that is generated based on data from marketing information module 14 and database 16 may be in a format ready for a subsequent communication operation (e.g., which may include printing, electronic transmission, producing an advertisement, producing a subscription, etc.), according to an exemplary embodiment. This campaign list may be supplied to a printing device 24 which prints publications (e.g., catalogs, flyers, brochures, inserts, coupons, magazines, etc.) based on the records on the list. The campaign list may be created and supplied (e.g., sent electronically by e-mail, sent on a CD-ROM or other memory device through the mail, etc.) from the data company to a third party printing or other communication or distribution company (e.g., another data company, a client, a marketer, a service bureau and/or any other third party). Alternatively, the list may be generated by a subsidiary or organization owned or controlled by a printing company or other company which owns or controls printing or other communication or distribution assets, which may be result in the list generation and communication or distribution being coordinated or managed "in house" within a single corporate entity.

It should be noted that the communication process may be electronic (e.g., personalized URL's ("PURLS"), e-mail, SMS text messaging, telemarketing, etc.) or printed (e.g., physical material), and the communication material may be advertisement or marketing material (e.g., direct mail, informational material, coupons, etc.), subscription material (e.g., magazine, newsletter, etc.), and/or any combination thereof. In the following exemplary embodiments, a printed direct mail campaign is utilized to illustrate this disclosure. However, it should be noted that one skilled in the art may substitute any of the other communication processes in these exemplary embodiments.

In an exemplary embodiment, record characteristic data 32 (see FIG. 2A) may have changed after the list was generated. For example, a targeted user's address may have changed in the days or weeks of time between the last update from the first information module 18 and the time the list of data has been processed by other services (e.g., merge/purge, address hygiene, etc.) and made ready for postal presort. Also, a targeted customer may have already bought a product that is the subject of the marketing campaign. If the campaign list is supplied to printing device 24 and processed, there are several potential negative consequences. The target user is less likely to receive the marketing information. Another user with a correct address could have been sent the marketing information, which may have increased the marketing campaign's success rate. The cost associated with selecting the target user, printing or electronically sending the material and mailing the material may have been wasted.

In an exemplary embodiment, a data processing system 100 (see FIG. 4) may be utilized to update record characteristic data 32 prior to printing, electronically sending, or otherwise communicating based on the list. In an exemplary embodiment, the list may be generated using data from marketing information module 14 and data from database 16. The data from database 16 may be modified by data from first information module 18. The data from database 16 may include a user named John Smith with an associated address of 123 Waverly Place. John Smith with the associated address of 123 Waverly Place may be selected to be part of the list. After the list is created, John Smith may move from 123 Waverly Place to 789 Main Street. Data processing system 100 may utilize a second information module 22 to modify the list to include John Smith's new address of 789 Main Street. Data processing system 100 may increase the marketing campaign's effectiveness by increasing the probability that the marketing information is received by the user.

In another exemplary embodiment, the list may be generated using data from marketing information module 14 and data from database 16. The data from database 16 may be modified by data from first information module 18. The data from database 16 may include a user named John Smith with an associated address of 123 Waverly Place. After the list is created, John Smith may request that his record be removed or suppressed from either one, a few, or all marketing campaigns. John Smith may have requested that he be removed from all marketing campaigns, from automobile and clothing campaigns only, or from only clothing campaigns. In this exemplary embodiment, sending marketing information to John Smith may create customer complaints (e.g., delayed compliance with "do not mail" request) while wasting marketing and environmental resources. Data processing system 100 may be utilized to modify the list. Data processing system 100 may remove one record (e.g., John Smith) from the list and add a different record (e.g., Robert Anderson) to the list. In an exemplary embodiment, Robert Anderson may be the person with the highest likelihood of utilizing (e.g., purchasing) the marketing information that was not on the original list. Robert Anderson may also be a person that has one or more similar demographics (e.g., male, age 40, single, etc.) with the replaced person (e.g., John Smith). Robert Anderson may also be selected for any number of different marketing objectives (e.g., test case).

In another exemplary embodiment, Mary Jones may be selected to be part of an insurance campaign. However, between the time Mary Jones is selected, but before the printing, electronically sending, or otherwise communicating of the campaign, Mary Jones may purchase life insurance. Since Mary Jones would unlikely need more life insurance, Mary Jones may be replaced or the marketing information (e.g., the message printed on the publication or inserted in the electronic message) may be altered to focus on automobile or home insurance.

In FIGS. 2A-2B, illustrations of comparing record characteristics to a record characteristic reference data are shown, according to exemplary embodiments. Record 30 may be based on data obtained from marketing information module 14, database 16, first information module 18, or any combination thereof. Record 30 may include any number of record characteristic data 32. In FIG. 2A, a prefix data field, a name field, an address1 field, an address2 field, an add a name field, a message field and a suppression field are shown, any of which may be record characteristic data 32.

Reference record 34 may include any number of reference data 36. Reference data 36 may include one, a few, or all of the data fields represented by record characteristic data 32. Reference data 36 may also include more data fields that are not represented by record characteristic data 32.

Figure 4:
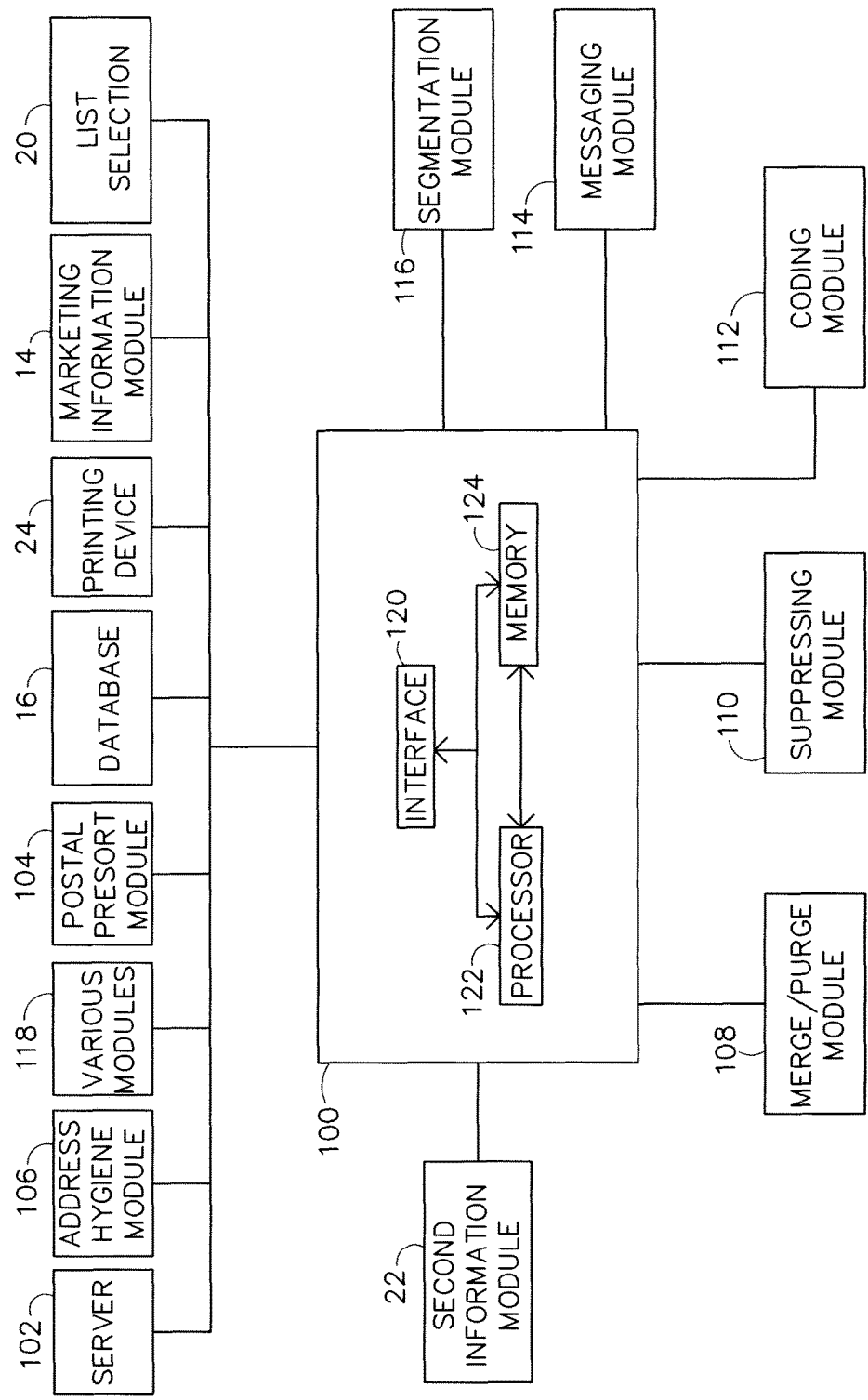
FIG. 4 is a circuit diagram of the data processing system, according to an exemplary embodiment.

Referring to FIGS. 2A, 2B and 4, data processing system 100 may be configured to compare record 30 with reference record 34 and may be further configured to update (e.g., change, verify, confirm, etc.) record 30 with one or more data from reference record 34. In an exemplary embodiment, record 30 represents Miss Mary Jones with a mailing address of 123 Singles Lane, Anywhere, N.Y. 12345 and a message which states "Thank you for purchasing product X. Did you know that our Y product goes great with product X?". It should be noted that any type of message may be utilized. For example, "Thank you for shopping with us. We value your business and hope to see you soon. Please take twenty percent off your next purchase." Another example may be, "Thank you for purchasing xyz dishwasher and financing the xyz dishwasher with us. To show our appreciation we have reduced the extended warranty plan on the xyz dishwasher by fifty percent." These marketing messages may be designed to increase the sales of additional primary products, increase the sales of complementary products, increase brand loyalty or customer satisfaction. In this exemplary embodiment, the add a name field in record 30 has not been selected and the suppression field indicates that record 30 is not being suppressed.

Data processing system 100 may compare one, a few, or all record characteristic data 32 with reference data 36 of reference record 34. In an exemplary embodiment, comparing record characteristic data 32 to reference data 36 indicates that the prefix has changed from Miss to Mrs. Similarly, the name has changed from Mary Jones to Mary Jones-Smith. Also, the address has changed from 123 Singles Lane, Anywhere, N.Y. 12345 to 123 Couples Court, Anywhere, Wis. 67890. The add a name data field has been checked, which indicates that a John Smith and a Lisa Smith should be added to this record 30. In an exemplary embodiment, John Smith may be Mary Jones-Smith's new husband and Lisa Smith may be Mary Jones-Smith's new stepdaughter. The message field has changed based on updated marketing information indicating that Mary Jones-Smith has recently been married to John Smith. The message now states, "Congratulations on your marriage. As a wedding gift please take an extra thirty percent off of your next purchase." Data processing system 100 may communicate with marketing information module 14 or any other information source to obtain updated user information. The suppression field has not changed and indicates that record 30 is not being suppressed. Data processing system 100 may modify one, a few, or all record characteristic data 32 in record 30 based on reference data 36 in reference record 34.

Referring to FIGS. 3A-3E and 4, additional illustrations of comparing record characteristics to a record characteristic reference data are shown, according to exemplary embodiments. In FIGS. 3A-3E, illustrations of utilizing an address hygiene module 106, a merge/purge module 108, a suppression module 110, and a coding module 112 are shown, according to exemplary embodiments. In FIG. 3A, record 30 includes Robert Brown with a mailing address of 123 White Avenue obtained from a data source one. A code 50 is a particular record characteristic data 32 that indicates the source of record 30, the source of record characteristic data 32 or identifies the marketing campaign. The source of record 30 may be any database which relates to record 30 and/or record characteristic data 32. For example, a COA, NCOA, DSF2, CDS, OPAC, AEC, ACS, LOT, commercial vendor mailing list (e.g., InfoGroup), a customer's marketing database and/or any combination thereof may be utilized as the source of record 30 and/or record characteristic data 32.

In an exemplary embodiment, merge/purge may be a process of combining two or more lists or files, simultaneously identifying and/or combining duplicates and eliminating unwanted records (e.g., records for individuals who are high credit risks, deceased, incarcerated, or records which are subject to direct marketing mail ("DMA") suppression, other do-not-mail and/or spam-style suppression, etc.). The merge/purge function may provide a mailer with the best possible list of names for a mailing campaign (e.g., printing or electronic). The input to a merge/purge may include of a few, some, or all of the lists the mailer has access to (e.g., rented, bought, created, etc.). In an exemplary embodiment, the customer's list (house list) may be used as a purge file, so that promotions intended to generate new customers are not sent to existing customers. The merge/purge program may describe the process the mailer uses to identify duplicates and how the mailer wants to allocate deductions for duplicates to the various lists. List rentals may be based on the number of names remaining after the merge/purge; thus, each list owner has an interest in having duplicates fairly allocated so that no one owner is excessively penalized. Reports may be generated showing how many names were input and output from the list. The report may also show the list broker.

In FIG. 3B, another record 30 includes Robert Brown with a mailing address of 123 White Avenue obtained from a data source which is identical to record 30 in FIG. 3A. Merge/purge module 108 compares these records 30 and may determine that these records 30 should be merged together to form one record 30.

In FIG. 3D, another record includes Robert Browny with a mailing address of 124 White Avenue from a data source two. Address hygiene module 106 may examine this record 30 and determine that 124 White Avenue should be 123 White Avenue. In an exemplary embodiment, merge/purge module 108 may further analyze record 30 and determine that Robert Browny should be Robert Brown. Merge/purge module 108 may merge these two records 30 together to form one record 30.

In FIG. 3C, another record 30 includes Robert Brown with a mailing address of 789 Blue Avenue from a data source one. Address hygiene module 106 and merge/purge module 108 may analyze record 30 in FIG. 3C and determine that no modifications of this record 30 are warranted because this is a different user.

In FIG. 3E, another record 30 includes Robert Brown with a mailing address of 123 White Avenue from a data source three. Record 30 indicates that this user should be suppressed from the mailing campaign. In an exemplary embodiment, a drop down window 52 is displayed once a yes box is checked under the suppression field. Drop down window 52 may be utilized to provide a reason for the suppression. These reasons may include a do-not-mail request, death, incarceration or other suppression criteria as may be determined by the user of the system.

In FIG. 4, a block diagram of data processing system 100 is shown, according to an exemplary embodiment. Data processing system 100 may include an interface 120, a processor 122 and a memory 124, according to an exemplary embodiment. Interface 120 and/or data processing system 100 may communicate with a server 102, a postal presort module 104, database 16, printing device 24, marketing information module 14, list selection module 20, a segmentation module 116, a messaging module 114, a coding module 112, suppression module 110, merge/purge module 108, address hygiene module 106, second information module 22 or other modules 118. The modules herein may be operable on one or more different computers and at different stages in a process, and may be representations of general functional operations carried out by one or more parties.

Memory 124 may include both a volatile memory and a non-volatile memory. Volatile memory may be configured so that the contents stored therein may be erased during each power cycle of data processing system 100. Non-volatile memory may be configured so that the contents stored therein may be retained across power cycles, such that upon data processing system 100 start-up, data from previous system use remains available.

Server 102 may be configured to operate one or more of postal presort module 104, marketing information module 14, list selection module 20, segmentation module 116, messaging module 114, coding module 112, suppression module 110, merge/purge module 108, address hygiene module 106, other modules 118 and second information module 22.

Address hygiene module 106 may correct errors in a user's address, address informalities (e.g., spacing, capitalization, etc.), or both. Merge/purge module 108 may merge duplicate or substantially duplicate records 30 together and purge records 30 that are deemed to be incorrect, corrupt, ineffective, or of no value. Suppression module 110 may suppress records 30 because of external factors (e.g., placed on do-not-mail list, deceased, prison term, or any other external reason). The suppression of records 30 is different that the purging of records 30. When record 30 is suppressed, the information from that record 30 is still in one or more of database 16, data processing system 100, first information module 18, or second information module 22. When record 30 is purged, the information from that record 30 is deleted from or no longer in one or more of database 16, data processing system 100, first information module 18, or second information module 22.

Coding module 112 may embed a bar code on the list to track the characteristics (e.g., general success rate, success rate with male users, success rate with female users, success rate with male users aged 40, etc.) of the data obtained from various data sources. Coding module 112 may code users into different groups. In an exemplary embodiment, group one has children and receives marketing information that considers this factor and group two does not have children and receives different marketing information.

Messaging module 114 may generate the messages inserted into the list. Messaging module 114 may track the success rate of various messages, store these success rates, and rank these success rates. In an exemplary embodiment, the message, "Thank you for purchasing product X. Did you know that our product Y goes great with product X?" has a twenty percent success rate with women aged 40, a fifteen percent success rate with women aged 35, and a two percent success rate with men aged 20. A second message of, "Thank you for purchasing product X. Did you know Joe Superstar wears product Y with product X?" has a twenty-five percent success rate with men aged 20. Messaging module 114 may rank the stored message and/or recommend that the first message be included in the marketing information sent to women aged 35 and 40 and the second message be included in the marketing information sent to men aged 20. It should be noted that numerous variations in user demographics and messaging techniques may be utilized with this disclosure.

Segmentation module 116 may include demographic data relating to the user and success rates for different product types (e.g., sweater, insurance, automobile, electronics) versus demographic data. In an exemplary embodiment, segmentation module 116 and messaging module 114 communicate to determine a recommended strategy for the information (e.g., messages) inserted into the list.

Marketing information module 14 may include data from outside sources that recommends targeting specific user (e.g., men aged 30 to 40 with income of $35,000-$50,000) with specific products (e.g., a new type of electronic product). In an exemplary embodiment, segmentation module 116, messaging module 114 and marketing information module 14 communicate to determine a recommended strategy for the information (e.g., messages) inserted into the list.

Figure 5:
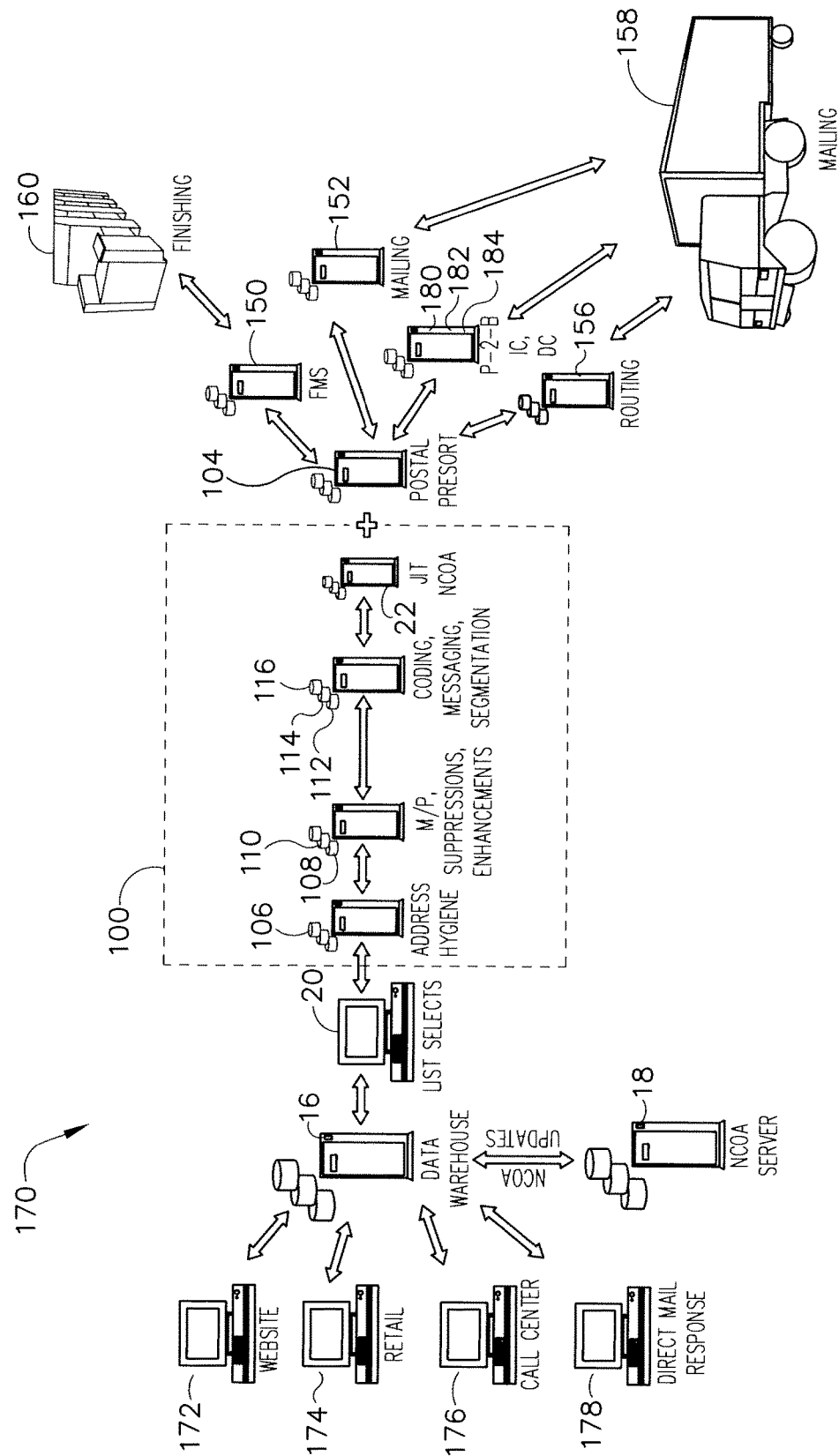
FIG. 5 is a second block diagram of the data flow, according to an exemplary embodiment.

In FIG. 5, a block diagram 170 of data processing system 100 and other printing processes are shown, according to an exemplary embodiment. Data may be received by database 16 from a transactional or other information source such as a website 172, a retail source 174, a call center 176, a direct mail source 178, or any combination thereof. Alternatively, the data may come from any other transactional database that collects and/or stores transactional information, including for example data from websites 172, retail sources 174, call centers 176, direct mail sources 178 and the like. The data from the transactional or information source may be combined with other marketing information from a marketing database or other source. The data may be compared to reference data 36 in first information module 18 and modified based on this comparison. List selection module 20 may create a list based on data from database 16 and/or marketing information module 14 (see FIG. 1). Data processing system 100 may modify a list by utilizing second information module 22, address hygiene module 106, merge/purge module 108, suppression module 110, coding module 112, messaging module 114, segmentation module 116, or any combination thereof.

Postal presort module 104 may categorize the list into different postal regions (e.g., Northeast, Northeast—Philadelphia—19136, Midwest—Milwaukee—53202), setup routing for pallets, determine rates, determine bundles and track the list through the shipping process, or other local or jurisdictional rules and regulations, for example the United States Postal Service domestic mail manual ("DMM").

According to one embodiment, second information module 22 may be configured to apply updated record data after all or substantially all other modules 106-116 have been implemented, and/or just prior to postal presort module 104. Second information module 22 may be configured to apply updated record data (e.g., NCOA, suppression, messaging, etc.) to the list in a "just-in-time" manner, and may be applied even though a same record characteristic data has been previously updated only days or weeks earlier (e.g., less than twelve weeks, less than eight weeks, less than four weeks, etc.) at first information module 18 or at one of modules 106-116. The updated record data may be data useful to suppress mailing to a class of recipients (e.g., unreceptive, unresponsive, or undesirable recipients), to change the messaging and/or marketing strategy, and/or to add new recipients or prospects to the mailing.

Modules 106-116 are shown sequentially and as being distinct, but may be any services applied to the list at different times, simultaneously with each other, at one or more locations, etc.

In one embodiment, upon updating the record and/or postal pre-sort at least a portion of the data can be sent to a file management system ("FMS") module 150. FMS module 150 may be used to control and manage the production of the printed material, including, for example, the scheduling, layout, printer layout, printer assignments, etc. For example, FMS module 150 may control the building of printed material in a finishing system 160 when dealing with hard printed material (as opposed to electronic printed material). FMS module 150 may obtain, or may instruct another module or controller to obtain, information from other databases and modules to assist in the building of the printed materials, for example from a mailing module 152, a press-to-bind ("P-2-B") module 180, an inventory control ("IC") module 182, a data collection ("DC") module 184 or other module.

In an exemplary embodiment, the list with the updated data may be sent to printing device 24 to implement the printing process with the updated data. In other exemplary embodiments, the list with the updated data may be sent to a third party printing company, a data company, a client, a marketer, a service bureau, and/or any other third party. In other exemplary embodiments, the list with the updated data may be sent to at least one of FMS module 150, finishing system 160, mailing module 152, P-2-B module 180, IC module 182, DC module 184 and/or a routing module 156. In an exemplary embodiment, the list with updated may be distributed to multiple modules which may increase the runtime by decreasing the data processing time.

In an exemplary embodiment, at least two of FMS module 150, finishing system 160, mailing module 152, P-2-B module 180, IC module 182, DC module 184 and/or routing module 156 may be implemented in an integrated manner. For example, the modules may communicate utilizing a common data protocol (e.g., Mail.Dat, an industry standard protocol, and/or a proprietary protocol). In other examples, communication from one module to the next may operate semi-automatically (e.g., with limited human input) or automatically (e.g., with minimal to no human input), may process work on a continual basis (e.g., twenty-four hours), may reduce error rates (e.g., formatting error, data entry or conversion errors, etc.), increase precision (e.g., reduced data corruption) and/or reduce runtime (e.g., reduce cycle time from creation of list to implementing communication process). In other exemplary embodiments, a few, a plurality or all of the modules utilize a common data protocol which enable the modules to process the data in parallel which may reduce the runtime to complete the communication process.

For purposes of this disclosure finishing system 160 may be any in-line or off-line process performed on the printed material after the printing is applied (i.e., after the printing line). Such a process may include binding (e.g., with glue or another adhesive or binder), stitching (e.g., with wire or another stitching material), trimming, gathering, collating, varnishing, laminating, embossing, bronzing, die-stamping, folding, perforating, punching, round cornering, padding, tin-edging, addressing, mail assembly and/or sorting, slitting, or wrapping tasks or functions, or any combination thereof. It is noted that finishing system 160 may be combined with a printing system in-line, at least in part, to perform both printing processes and finishing processes or they may be separate systems with the printed materials transferred from the printing system to the finishing system for further processing. In either an inline or offline finishing process a message, address, or other information that includes variable data may be included on the printed publications (e.g., magazines, catalogs, direct mail pieces, advertisements, etc.), blow-in material, bind-in material, stickers, onserts, inserts, tipons, or other printed materials.

Mailing module 152 may be used to collect, store, and/or control information to optimize mailing and distribution savings, and potentially be used to combine different printed materials to achieve postal discounts and savings.

A build module, such as in one embodiment for hard printed materials, P-2-B module 180 may be used to collect, store and/or control various information about the printed material, including for example, title data, publisher data, version data, print type data, print requirement data, scheduling, etc. on a company-wide, plant, or job level.

IC module 182 may be used to collect, store and/or control inventory information relating to the tracking of product printed material, including for example, paper data, ink data, package data, etc.

DC module 184 may be used to collect, store and/or control various data of interest, including for example, completion data, waste data, efficiency data, error data, productivity data, tracking data, data associating each printed material with the equipment used to build, assemble and/or print the printed material, accounting data, etc.

Routing module 156 may be used to route inventory, shipping, or other material handling needs for the assembly and printing of the printed materials and other distribution data. Such distribution data may be used to schedule shipments of printed material, provide material handling data, etc. Such information also may be associated with a transportation system 158.

Like the other modules described, FMS module 150, build module (e.g., P-2-B module 180), IC module 182, DC module 184, routing module 156 or other module may be discrete modules or may be modules of a single system, they may be software or a combination of software and hardware, they may be at a single location or different locations, and they may be operated and/or controlled by a single corporate entity or different corporate entities.

Figure 6:
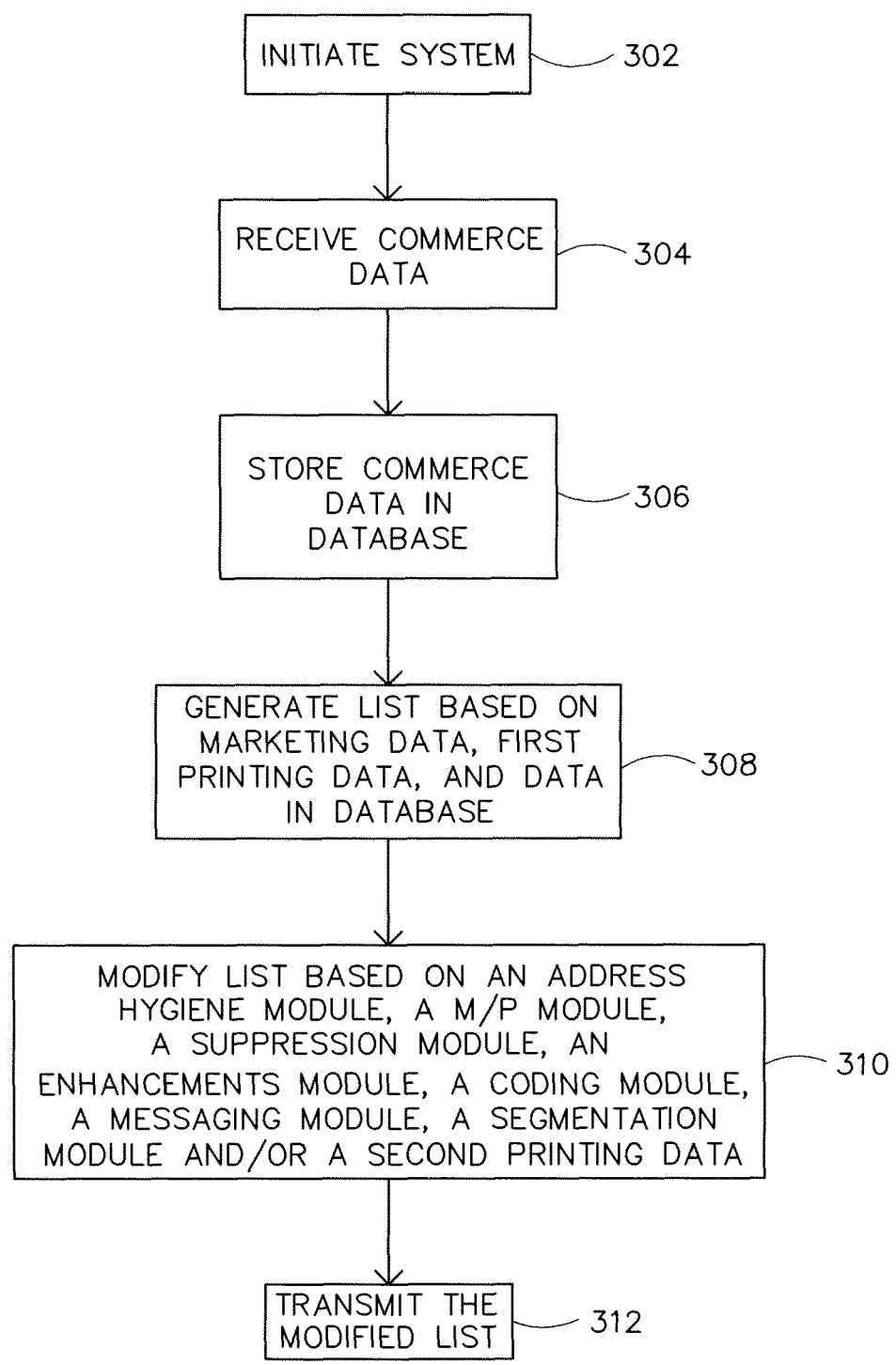
FIG. 6 is a flowchart of the operating procedures of the data processing system, according to an exemplary embodiment.

In FIG. 6, a flowchart of the operating procedures of the data processing system 300 is shown, according to an exemplary embodiment. Data processing system 100 is initiated (step 302). Database 16 receives commerce information from an information source such as website 172, retail source 174, call center 176 and/or direct mail source 178 (step 304). Database 16 stores commerce information (step 306). List selection module 20 generates a list based on data from marketing information module 14, first information module 18, and/or data in database 16 (step 308). Data processing system 100 modifies the list based on address hygiene module 106, merge/purge module 108, suppression module 110, coding module 112, messaging module 114, segmentation module 116, and/or second information module 22 (step 310). Data processing system 100 transmits modified list (step 312).

Figure 7:
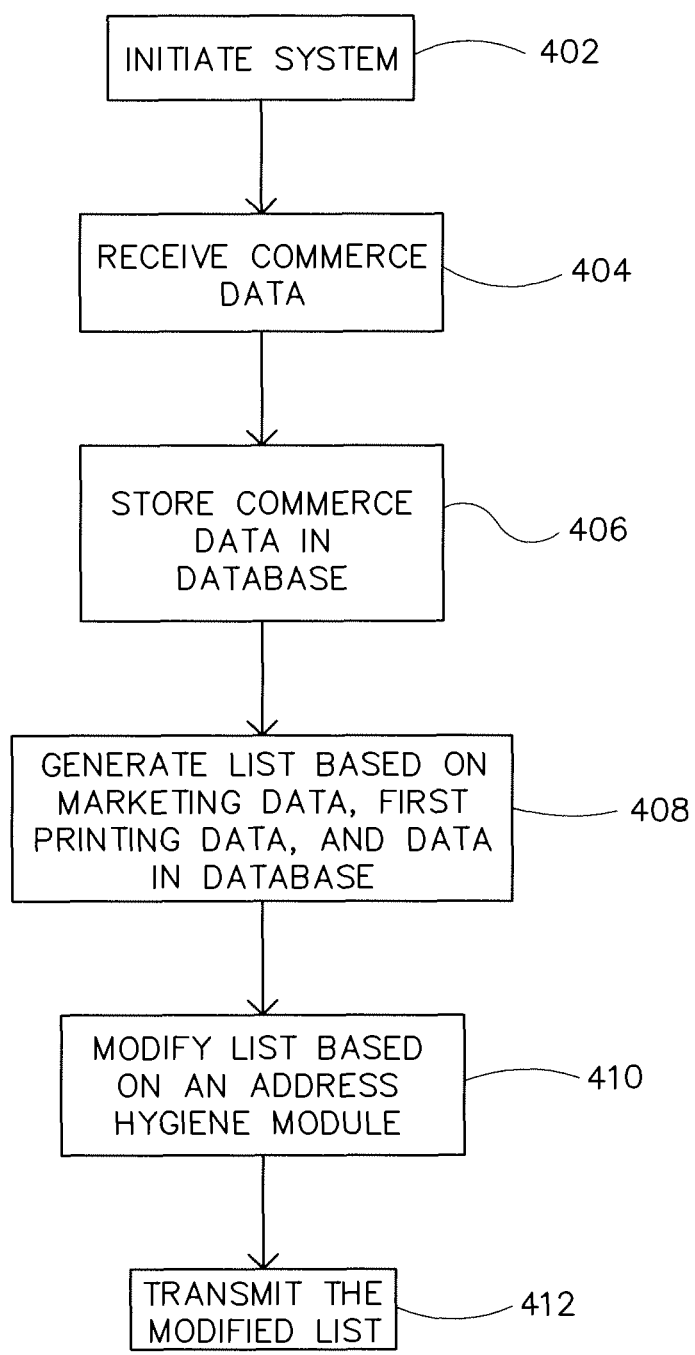
FIG. 7 is another flowchart of the operating procedures of the data processing system, according to an exemplary embodiment.

In FIG. 7, another flowchart of the operating procedures of the data processing system 400 is shown, according to an exemplary embodiment. Data processing system 100 is initiated (step 402). Database 16 receives commerce information from an information source such as website 172, retail source 174, call center 176 and/or direct mail source 178 (step 404). Database 16 stores commerce information (step 406). Records in database are subjected to a change, for example a record update of NCOA data or other update as described herein. List selection module 20 generates list based on data from marketing information module 14, first information module 18, and/or data in database 16 (step 408). Data processing system 100 modifies change of address information utilizing second information module 22 (step 410). Data processing system 100 transmits modified list (step 412).

Figure 8:
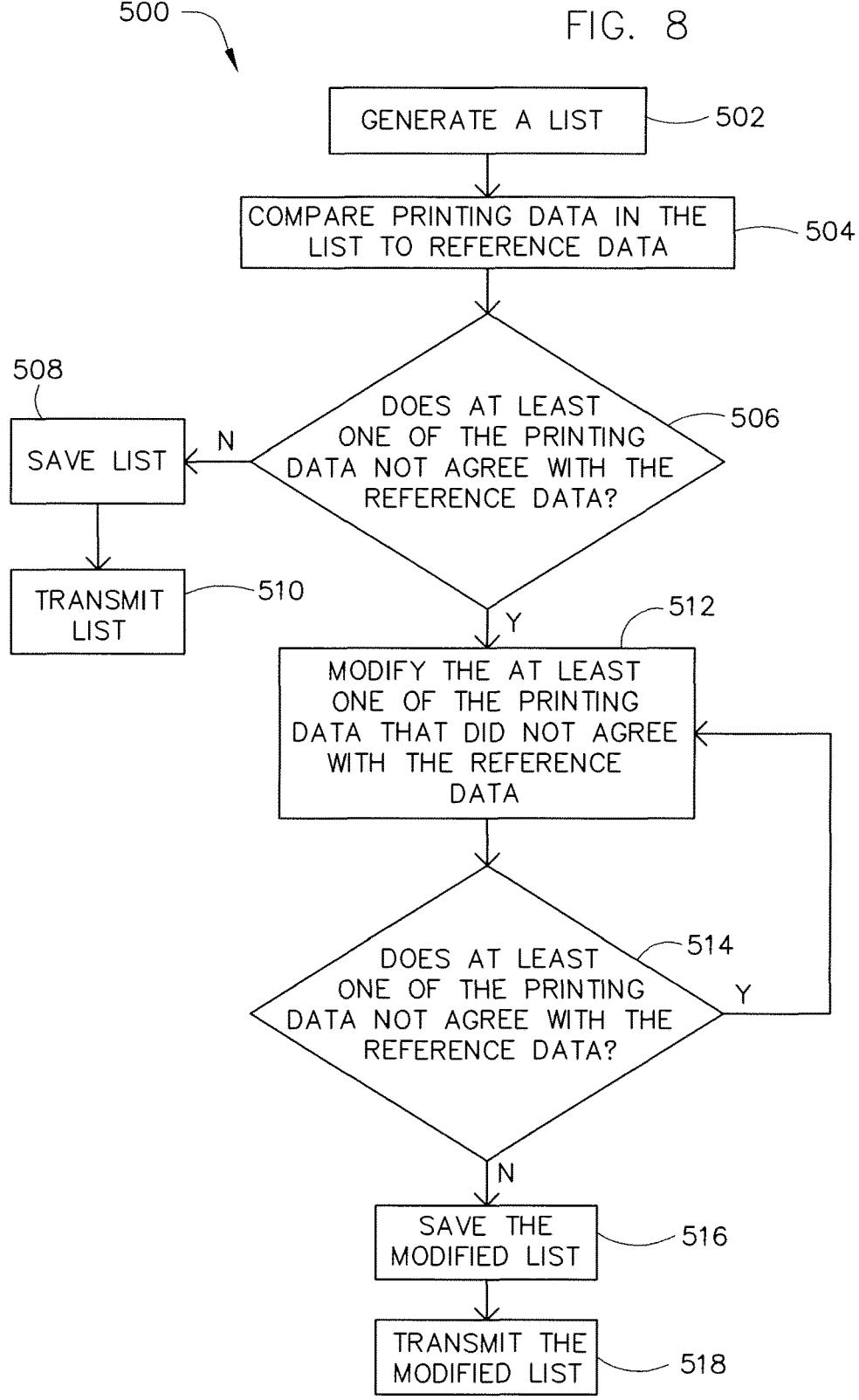
FIG. 8 is another flowchart of the operating procedures of the data processing system, according to an exemplary embodiment.
Figure 10:
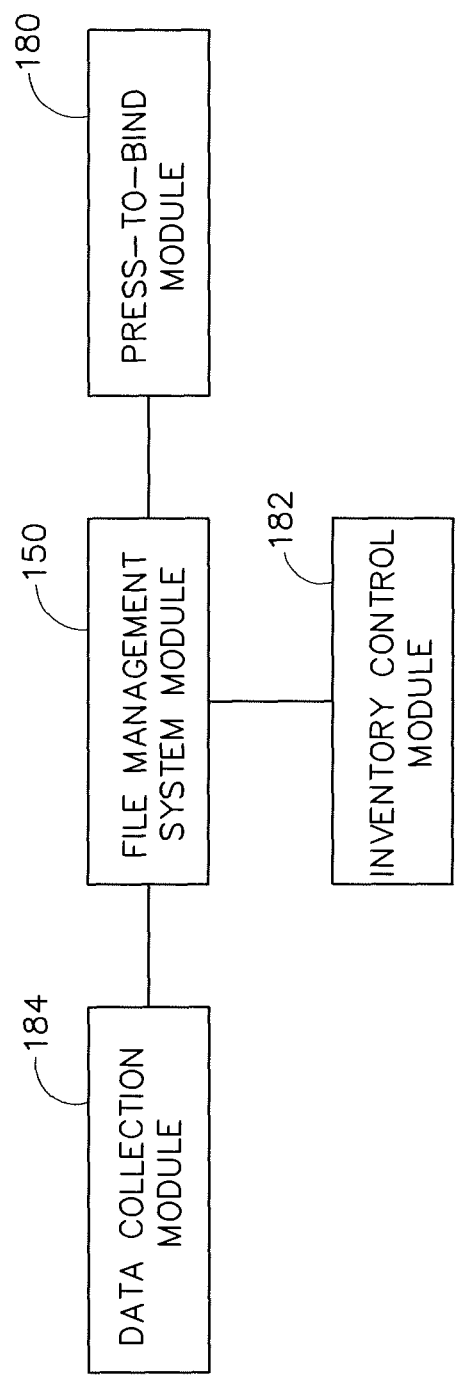
FIG. 10 is a block diagram of a file management system module communicating with other modules, according to an exemplary embodiment.

In FIG. 8, another flowchart of the operating procedures of the data processing system 500 is shown, according to an exemplary embodiment. A list is generated for a printing operation (step 502). Data processing system 100 compares record characteristic data 32 on record 30 from the list to reference data 36 on reference record 34 (step 504). Data processing system 100 determines whether at least one of record characteristic data 32 does not match with reference data 36 (step 506). If all of record characteristic data 32 matches reference data 36, then data processing system 100 saves the list (step 508) and transmits the list (step 510). If at least one of record characteristic data 32 does not match with reference data 36, then data processing system 100 modifies the at least one record characteristic data 32 (step 512) and moves to step 514. Data processing system 100 determines whether at least one record characteristic data 32 does not match with reference data 36 (step 514). If all of record characteristic data 32 matches reference data 36, then data processing system 100 saves the modified list (step 516) and transmits the modified list (step 518). If at least one of record characteristic data 32 does not match reference data 36, then data processing system 100 returns to step 512.

It should be appreciated that the features, advantages, and any other subject matter described in U.S. Patent Application No. 2007/0024907 entitled, "Method for Managing Desired Print Content of a Print Job" filed on Jun. 29, 2005, may be used and/or incorporated with the subject matter described herein.

A print content management system may manage the print content of the desired print job for the customer and produces a content data file in a digital format, to be used in conjunction with printing the desired print job. Once generated, the content data file for the print job may be communicated to the printer system and one or more imaged plates can be produced by a plate production component. The desired print job may then be printed using a sequential printing processes. Specifically, the print job may be printed using a first printing device for printing copies of the common portion of the printable work on a web and then using a second printer for printing the customized portions on the web after the common portions have been printed. For example, the first printing device may be a printing press using the imaged plates, and the second printing device may be a printer not having plates, such as an ink-jet or laser printer. Both printing processes may occur while the paper is in web form and later the pages can be separated and collated to produce individual customized versions of the work. Alternatively, a single printing system may be used to provide both the common (static) portion and the customized (variable) portion.

In an exemplary embodiment, the network is the Internet, although the network may include other types of networks and/or sub-networks, comprising local area networks, wide area networks, public switched telephone networks, Intranets, or any other suitable networks.

The customer system may include a plurality of computer terminals, each comprising hardware such as a processor, I/O interfaces, and memory; and software such as an operation system, a display application, a communications application, and other software as necessary or desired. In particular, each computer terminal may be equipped with a communications interface such as a web browser for accessing web sites on the Internet. The customer system may also include other components such as a sub-network, a server or a database. The computers may be remote from the print content management system and/or remote from each other.

In one embodiment, the users may access a web site via the Internet from the computer terminals in order to select or input corresponding customized content for the customizable portion of the printable work. In this manner, a user may be remote from the print content management system and the print content management. The user may input the common and customized portions or different users may input the common and/or customized portions.

In one embodiment, the customer system includes computer terminal operated by a first authority level user, and computer terminals each operated by a second authority level user. For example, the first authority level user may be a user looking out for the general interests of the customer, where the customer is a company. Further, the plurality of second authority level users may be the dealers, licensees, franchisees, employee or representative of the company. The customer or company would like to provide a printable work to be distributed to potential consumers of its goods or services and would like to provide its dealers or representatives, and the second authority level users, with the opportunity to add customized content to the printable work, and perhaps manage a distribution list of intended recipients of the printable work. However, the company might also like to retain ultimate authority over the customized content added and the format of the entire printable work. For example, the company may want to ensure consistent usage of brand materials including trademarks, trade names or the like, may want to dictate the font types and colors of customized information, may want to ensure consistent pricing of goods or services, or may want to insure that information or material present in the printable work conforms to certain regulations. For these and other reasons, it may be desirable to ensure that the digital content data file contains only validated or authorized customized versions of a printable work, and that only these authorized versions will actually be printed and distributed.

The print content management system may determine an electronic template of the printable work, wherein the printable work includes a common portion and at least one customizable portion. Optionally, various parameters for authorized content for the customizable portion of the printable work are also determined.

The template may also be developed for the customer by a publisher or other entity acting for the customer. For example, the desired printable work may be the customer's magazine or promotional piece. The customer (directly or indirectly through another) may provide images and data of desired content for the magazine using slides or computer files to create one or more electronic "pages" which describe the content and layout of desired pages of the printable work. In this example, the desired printable work is a company's magazine, is intended to be eight pages, and includes one or more customizable portions such as customizable portions.

As more fully described below, various parameters defining authorized content for the customizable portion may be imposed by the customer and implemented by the service provider. This insures that a customized version of the printable work includes only authorized content that is authorized by the company. In one example, the company may desire that, for the customizable portion, the second authority level users each be allowed to select one from among two or more provided options to include as customized content in a corresponding customized version. For example, the provided options may include a first advertisement and a second advertisement. These permitted options would also be provided to the print content management system as electronic files.

A web site may be implemented by the service provider to allow users to create customized versions of the printable work by accessing the web site at a predetermined network address. The web site can include various pages such as a login page, a status page, and a form for allowing each of a plurality of users to associate a corresponding customized content with each customizable portion of the printable work. The web site can also include various pages accessible to administrators to provide status updates regarding the various users.

The login page can allow registered users access to the other pages of the web site and the status page can provide users with information regarding the status of a specific printable work and any other printable works that may need to be customized. The form can be stored in the database, and can be accessed by a logged in user accessing the web site at the particular network address. The created pages may include company information and trademarks such that the company appears to sponsor the web site.

Once the web is implemented, registered users who access the web site at the network address are each allowed to log in to the web site, such as by entering a username and password. Once logged in, the system can provide to the user a status update. In some cases, the company may want to print an issue of its magazine at pre-specified intervals and each issue may require customization. In this example, the company produces a magazine issue every other month and the print content management system can determine and keep track of a plurality of customized versions for each issue. Status information may be provided for each printable work, such as whether or not customized content has been received or approved.

A logged in user may be allowed to access the form, optionally manage a distribution list of intended recipients, and associate corresponding customized content with the customizable portion or portions to generate one or more customized versions. The form pages may take a variety of forms and are created taking into account any parameters imposed on the customized content. A user may simply select one of the titled options to determine corresponding customized content for a portion, but in other cases, thumbnail sketches of the advertisements could also be displayed such that a user has a better idea of the actual content of the available options.

For example, the company may desire that any savings in the certificate reflect specific specified increments, such as $100 increments, implement a maximum savings amount, and/or desire that any savings be limited to specified models or services. The user may input selections or data on this form and these selections or data comprise the user's corresponding customized content and are transmitted to the print content management system.

A user may be allowed to input a dealer name, address, and store hours, and perhaps a photo of the dealer or dealership. This information may be transmitted to the print content management system.

Once the customized content for each customizable portion has been received, the customized content and the template together define a customized version of the printable work. For example, in the template, the company may specify font type, size, and placement of any inserted content and/or additional content to be added to the customizable version based on what is input by the user. In this manner, the company can retain ultimate authority over the printable work but can allow for some content choices to be made by a user. The use of a customizable portion allows for many possibilities regarding customized content.

A user may manage a distribution list of intended recipients, such as by entering or updating names and addresses of the intended recipients of the printed work. In other cases, recipients can be determined by the customer or can be determined by obtaining lists from a list source. Then, when printing the print job, the names and address of intended recipients may also be respectively printed by the second printing device.

Another optional feature that may be implemented by the system is to allow the users to determine different customized versions for different recipients, using a web page to input various selections.

A preview image of at least the customized portion of the determined customized version may be generated and provided to the corresponding user. In one embodiment, the preview image is sent in PDF format via e-mail. The preview image includes the selected or input customized content in the template. In this manner, a user may be allowed to view the customized version of the printable work as it will be printed and insure that the correct and accurate content is included. The user may then input approval of any customized versions via the status page or via another page on the web site and the print content management system receives this approval if supplied. Because the implemented web site makes it easy for users to determine and approve the authorized customized content, any desired changes may be easily made. The web site may also include information regarding an imposed deadline after which changes will not be accepted.

The print content management system may determine whether the customized content is complete, authorized, and approved for each customized version.

A desired number of copies for each customized version may be determined. For example, this information may be provided by the first authority level user, the second authority level user, or may be a predetermined amount. A web site may allow an administration to supply a desired number of copies to be associated with each customized version prepared by various dealers. This feature can be advantageous especially in a situation where each dealer (second authority level users) has varying distribution needs and/or when a company and its dealers want to equitably divide the costs of the print job.

A status page may be provided to a first authority level user regarding the status of the customized versions determined by the second authority level users. A web page may allow an administrator, or first authority level user to view the status of its dealers, or second authority level users with respect to various printable works. The first authority level users may also be provided with administration powers on the web to perform certain tasks related to the desired print job. For example, these powers may include selecting or providing customized content for second authority level users who have not done so, managing distribution lists, and providing approval for users who have not provided approval.

Once it is determined that the each customized version is complete, authorized and approved and corresponding numbers of copies are determined, a content data file can be produced for the desired print job. The desired print job can be printed. Specifically, the print job including all the customized versions may be printed using first and second printing devices, or with a single printer, as described above.

The content data file is advantageous because the print order of the copies of the printable work may be manipulated such that the printing device prints the names and addresses of the intended recipients in zip code order or in another form so as to take advantage of postal discounts or the like, or by applying updated record data to the content data file as described herein, the files may be made more relevant to the recipients or more efficient for the publisher (e.g., applying just in time suppression, change in marketing strategy, and/or adding new names and prospects to the marketing campaign.

According to one exemplary embodiment, a change in record characteristic data 32 such as NCOA, suppression, etc. can be applied to a list of records selected for a printing operation in a reduced amount of time, such as, less than 19 days, less than two weeks, or other reduced period of time from receipt of the change to application to the list. In this manner, more updates can be reflected in the list of records selected for a printing operation to reduce waste and improve a success ratio of purchases per publication sent.

According to another embodiment, changes in record characteristic data 32 can be made at least twice, once before and once after the creation of the list based on queries of the databases to fulfill the marketing plan. Alternatively, at least two updates in record characteristic data 32 can be made after the list is generated, but at different times (e.g., multiple days or weeks apart), to realize some of the advantages described herein.

According to another embodiment, a module may be configured to replace any records in the list suppressed by second information module 22, change messages of records based on suppression data or other transaction data.

According to another embodiment, predetermined characteristics of the list for the printing operation may be updated or changed after postal presort (e.g., suppression data, phone number, etc.) to realize further improvements in the just-in-time updating of records in a print list.

According to another embodiment, a suppression step may be performed before, during or after creation of a list based on database searching, and an additional suppression step may be performed just prior to, during or after a postal presort step. In this manner, an approximately accurate count may be obtained based on the first suppression step so that printing resources (e.g., paper, ink, press time, etc.) may be more closely estimated.

FIG. 9 illustrates the results from a single mailing to 4,588,879 recipients, done by a retail cataloger using just-in-time NCOA verification before postal pre-sort as described herein. The retail cataloger applied a monthly NCOA update to its customer list. As shown in FIG. 9, when a second NCOA update was made to the customer list just prior to postal pre-sort, a significant number of address changes were identified (Total NCOALink New Addresses of 169,798) that were not identified in the single, monthly NCOA update. At an estimated cost per piece for paper, postage and manufacturing of fifty cents ($0.50), the savings in these costs alone, excluding lost orders) would amount to almost $85,000.

Although the description contains many specifics, these specifics are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. All structural, chemical, and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims. It is to be understood that the disclosure is not limited in its application to the details of construction and the arrangement of components set forth in the description or illustrated in the drawings. The disclosure is capable of other embodiments and of being practiced in various ways. Also, it is to be understood that the phraseology used herein is for the purpose of description and should not be regarded as limiting. It should be noted that "module" may be a functional unit related to a method, a device, software, or any combination thereof, any may be operable or found in one or more pieces or software, or be a combination of software and non-software systems. Use of the term module herein may refer to either computer program and/or circuit components operating the computer program (e.g., one or more computers, servers, etc.) to carry out the functions described herein, either automatically without user input or under control of a user. Modules may interface with other modules at a hardware and/or computer program level, and may operate at and/or interface with other modules at any applicable computer program level specified in the Open Systems Interconnection (OSI) model, such as application layer, presentation layer, session layer, transport layer, network layer, data link, physical layer, etc. Modules may be represented by a block, multiple blocks or portions of blocks in the various figures herein.

What is claimed is:

1. A method of preparing data for use in a printing operation, comprising:
   receiving records comprising name information and a mailing address for each of a plurality of intended recipients of printed materials;
   updating the records with an updating step using data from a national change of address database, wherein a time at which the updating step is performed is determined in relation to a print production schedule of the printed materials; and
   creating a postal pre-sort file based upon the updated records for use in the printing operation.

2. The method of claim 1, wherein the updating step comprises a second updating step and the national change of address database comprises a first national change of address database, and wherein the records have been subjected to a first updating step using data from at least one of the first national change of address database or a second national change of address database.

3. The method of claim 2, wherein the data used in the second updating step is more recently updated than the data used in the first updating step.

4. The method of claim 2, wherein a new recipient is added to the records based on updating the records with the second updating step.

5. The method of claim 2, wherein a new message is added to the records based on updating the records with the second updating step.

6. The method of claim 1, further comprising, before the updating step, modifying the stored records based on a record suppression status.

7. The method of claim 1, further comprising, before the updating step, modifying the stored records based on message information.

8. The method of claim 1, wherein the records further comprise at least one of a record suppression status or message information.

9. A data processing system comprising:
a processor configured to:
receive records comprising name information and a mailing address for each of a plurality of intended recipients of printed materials;
update the records with an updating step using data from a national change of address database at a time determined in relation to a print production schedule of the printed materials; and
create a postal pre-sort file based upon the updated records for use in the printing operation.

10. The system of claim 9, wherein the national change of address database comprises a first national change of address database and the updating step comprises a second updating step, and wherein, prior to the processor updating the records with the second updating step, the records have been subjected to a first updating step using data from at least one of the first national change of address database or a second national change of address database.

11. The system of claim 10, wherein a new recipient is added to the records based on updating the records with the updating step.

12. The system of claim 10, wherein a new message is added to the records based on updating the records with the updating step.

13. The system of claim 10, wherein the records updated with the second updating step further comprise at least one of a record suppression status or a message status.

14. The system of claim 10, wherein the data used in the second updating step is more recently updated than the data used in the first updating step.

15. A method of preparing data for use in a printing operation, comprising:

receiving records comprising name information and a mailing address for each of a plurality of intended recipients of printed materials;
updating the records with an updating step at a time determined in relation to a print production schedule of the printed materials, wherein the updating step comprises at least one of:
a national change of address updating step in which the mailing address is updated using data from a national change of address database;
an address hygiene step in which one or more errors in the mailing address are corrected;
a record suppression step in which one or more of the records are suppressed such that the printed publication is not sent to the intended recipients associated with the suppressed records; or
a merging step in which one or more duplicate records are removed from the records; and
creating a postal pre-sort file based upon the updated records for use in the printing operation.

16. The method of claim 15, wherein the updating step comprises the national change of address updating step and at least one of the address hygiene step, the record suppression step, or the merging step.

17. The method of claim 16, wherein the updating step comprises a second updating step and the national change of address database comprises a first national change of address database, and wherein the records have been subjected to a periodic first updating step using data from at least one of the first national change of address database or a second national change of address database.

18. The method of claim 17, wherein the data used in the second updating step is more recently updated than the data used in the periodic first updating step.

19. The method of claim 17, wherein a new recipient is added to the records based on updating the records with the second updating step.

20. The method of claim 17, wherein a new message is added to the records based on updating the records with the second updating step.

* * * * *